United States Patent
Ziegler

[11] Patent Number: 6,152,456
[45] Date of Patent: Nov. 28, 2000

[54] CYLINDER HEAD GASKET

[75] Inventor: Hans Ziegler, Bad Urach, Germany

[73] Assignee: Elringklinger GmbH, Germany

[21] Appl. No.: 09/212,512

[22] Filed: Dec. 16, 1998

[30] Foreign Application Priority Data

Dec. 18, 1997 [DE] Germany .............. 197 56 431

[51] Int. Cl.$^7$ ...................................... F02F 11/00
[52] U.S. Cl. ..................... 277/593; 277/595; 277/598
[58] Field of Search ....................... 277/313, 594, 277/593, 595, 598; 29/432.2

[56] References Cited

U.S. PATENT DOCUMENTS

| | | | |
|---|---|---|---|
| 3,885,299 | 5/1975 | Hafner | 29/521 |
| 5,138,758 | 8/1992 | Gubbiotti et al. | 29/432.2 |
| 5,408,735 | 4/1995 | Schleicher | 29/432.2 |
| 5,979,035 | 11/1999 | Tahara et al. | 29/432.2 |

FOREIGN PATENT DOCUMENTS

| | | |
|---|---|---|
| 42 19 709-A1 | 6/1992 | Germany . |
| 195 23 825-A1 | 6/1995 | Germany . |
| 195 36 718-A1 | 9/1995 | Germany . |

*Primary Examiner*—B. Dayoan
*Assistant Examiner*—Alison K. Pickard
*Attorney, Agent, or Firm*—Edward J. Timmer

[57] ABSTRACT

In a cylinder head gasket with a gasket plate comprising at least three metallic plate layers superimposed one upon the other and at least one combustion chamber hole, with a beaded plate layer arranged on either side of an inner plate layer, each of the beaded plate layers having a bead enclosing the combustion chamber hole, protruding in the direction towards the inner plate layer and forming a combustion chamber sealing element, and with a metallic stopper ring immediately adjacent to the combustion chamber hole and enclosing this combustion chamber hole, the stopper ring being arranged radially inside the beads, bordering on an inner edge of the inner plate layer which encloses the combustion chamber hole, and projecting over the two main surfaces of the inner plate layer so as to delimit the deformability of the beads in the direction perpendicular to the plane of the gasket plate, in order to obtain a tension-free stopper ring and minimize the material waste, such a cylinder head gasket is constructed such that the stopper ring comprises a ring-shaped main body and at least one sheet metal ring, which are superimposed one on the other in the direction perpendicular to the plane of the gasket plate, the thickness of the main body of the stopper ring being a multiple of the thickness of the sheet metal ring, and the main body of the stopper ring being a part punched out of the inner plate layer.

18 Claims, 1 Drawing Sheet

CYLINDER HEAD GASKET

The present disclosure relates to the subject matter disclosed in German application No. 197 56 431.3 of Dec. 18, 1997, the entire specification of which is incorporated herein by reference.

FIELD OF THE INVENTION

The invention relates to a cylinder head gasket with a gasket plate comprising at least one combustion chamber hole and at least three metallic plate layers superimposed one upon the other, two outer plate layers thereof receiving between them an inner plate layer, and with a metallic ring immediately adjacent to the combustion chamber hole and enclosing this combustion chamber hole so as to raise the pressure around the combustion chamber hole, the ring bordering on an inner edge of the inner plate layer which encloses the combustion chamber hole and projecting over at least one of the two main surfaces of the inner plate layer. In particular, the invention relates to a cylinder head gasket in which each of the two outer plate layers has a bead enclosing the combustion chamber hole, protruding in the direction towards the inner plate layer and forming a combustion chamber sealing element. The bead extends—in the plan view of the gasket plate—radially outside of the said ring which projects over both main surfaces of the inner plate layer in order to delimit the deformability of the beads in the direction perpendicular to the plane of the gasket plate.

In order to avoid misunderstandings, it is pointed out that in cylinder head gaskets with more than three plate layers, the aforementioned outer plate layers do not have to lie at the outside of the gasket plate. Furthermore, it is not absolutely essential for any of the plate layers to extend over the entire gasket plate.

BACKGROUND OF THE INVENTION

Such cylinder head gaskets with beaded outer plate layers and a one-piece, metallic ring acting as a so-called stopper ring which encloses the combustion chamber hole and projects over both main surfaces of the inner plate layer are to be taken from FIG. 2 of DE-A-195 36 718 and from FIG. 8 of DE-A-42 19 709. In the manufacture of these known cylinder head gaskets, a circular opening whose diameter exceeds the diameter of the combustion chamber hole by at least twice the width of the stopper ring is punched out of the inner plate layer. There is also punched out of a metal sheet whose thickness exceeds the thickness of the metal sheet of the inner plate layer by the sum of the projections of the stopper ring over the inner plate layer, a stopper ring which is inserted into the opening of the inner plate layer and is optionally soldered thereto (see DE-A-195 36 718). In the manufacture of these known cylinder head gaskets quite a lot of waste is produced in the form of the circular disc punched out of the inner plate layer and the circular disc resulting from punching out the stopper ring. A further disadvantage of these known cylinder head gaskets is to be seen in that the stopper ring has to be calibrated with respect to its height as the thickness tolerances of thicker metal sheets are correspondingly larger than the thickness tolerances of thinner metal sheets.

To eliminate these disadvantages, cylinder head gaskets with beaded outer plate layers have already been constructed wherein the inner plate layer has an offset bend around the combustion chamber hole so that a ring-shaped area of the inner plate layer enclosing the combustion chamber hole projects on the one side and is set back on the other side with respect to the inner plate layer. Placed on the last-mentioned side of this ring-shaped area is a sheet metal ring which is congruent with this area and the sheet thickness of which is twice as large as the projection of the offset bent area of the inner plate layer on the other side, which results in a ring-shaped stopper structure for the beads of the two outer plate layers. However, these known cylinder head gaskets have another disadvantage: Tensions are caused by the offset bending in the inner plate layer around the combustion chamber hole, which result in the offset bent inner plate layer arching and warping in the vicinity of the combustion chamber hole. This causes problems for the gasket manufacturer when handling and joining the layers of the gasket plate and also problems when assembling the engine. Moreover, this distortion of the inner plate layer makes it difficult to adhere to the layer tolerances of the components of the cylinder head gasket around the combustion chamber hole, i.e., in the most critical area of a cylinder head gasket.

In cylinder head gaskets of the kind described above with beaded outer plate layers, the stopper ring or the ring-shaped stopper structure consisting of the offset bent area of the inner plate layer and the sheet metal ring not only has the task of preventing undesirably strong deformations of the beads of the outer plate layers on tightening the cylinder head screws and while the engine is running, but also owing to the stopper ring or stopper structure described above, the aim is achieved that the highest specific surface pressures between cylinder head and cylinder head gasket, on the one hand, and engine block and cylinder head gasket, on the other hand, occur immediately around the combustion chamber hole when the cylinder head gasket is installed.

Cylinder head gaskets of the kind first mentioned at the outset are also already known wherein the outer plate layers have no beads around the combustion chamber hole, and, nevertheless, a stopper ring-like structure is present around the combustion chamber hole in order to achieve the aim that the highest specific surface pressures between cylinder head gasket, cylinder head and engine block occur immediately around the combustion chamber hole, so the combustion chamber is sealed off also without beads on the outer plate layers. Naturally, the same problems and disadvantages arise with these known cylinder head gaskets as explained above for known cylinder head gaskets with beaded outer plate layers.

SUMMARY OF THE INVENTION

The object underlying the invention was to so improve these known cylinder head gaskets that the above-mentioned disadvantages and problems are at least substantially eliminated.

Starting from a cylinder head gasket of the kind first mentioned at the outset this object is accomplished in accordance with the invention in that the ring comprises a joining member cut out of the inner plate layer and having the same thickness as the inner plate layer, the joining member being inserted into the opening produced in the inner plate layer by the cutting-out so as to project by a fraction of the thickness of the inner plate layer over one main surface thereof, and in that a sheet metal ring is arranged between the joining member and that outer plate layer which faces away from the projecting side of the joining member, the radial outer contour of the sheet metal ring lying—in the plan view of the inner plate layer—within the opening of the inner plate layer, and the thickness of the joining member being a multiple of the thickness of the sheet metal ring, for example, at least three times, preferably at least four times, the thickness of the sheet metal ring.

The cylinder head gasket according to the invention has the advantage over the above-described known cylinder head gasket with offset bent inner plate layer that the stopper ring or stopper ring-like structure can be manufactured without tensions being generated in the inner plate layer, i.e., tensions which would result in archings, warpings or distortions in the inner plate layer in the vicinity of the combustion chamber hole. In comparison with the cylinder head gaskets according to DE-A-195 36 718 and DE-A-42 19 709, material is saved by the invention, although waste is produced during the manufacture of the sheet metal ring of the cylinder head gasket according to the invention, for owing to the slight sheet thickness of this sheet metal ring a relatively small amount of waste occurs during the punching-out of the sheet metal ring. Moreover, the invention also has the advantage over this prior art that the stopper ring or the stopper ring-like structure does not have to be calibrated as the joining member has the same thickness tolerances as the inner plate layer and the thickness tolerances of the thin sheet metal ring are negligible by comparison.

The inventive solution is suitable not only for cylinder head gaskets wherein the two outer plate layers have no beads around the combustion chamber hole but also for cylinder head gaskets with beaded outer plate layers and an area immediately enclosing the combustion chamber hole and having a genuine stopper function for the beads of the two outer plate layers. Such embodiments of the cylinder head gasket according to the invention are characterized by each of the outer plate layers having a bead enclosing the combustion chamber hole, protruding in the direction towards the inner plate layer and thus forming a combustion chamber sealing element, the bead extending—in the plan view of the gasket plate—radially outside of the joining member and of the sheet metal ring so that the deformability of the beads in the direction perpendicular to the plane of the gasket plate is delimitable by the joining member and the sheet metal ring.

As in the known cylinder head gaskets described above, in preferred embodiments of the cylinder head gasket according to the invention, the joining member and the sheet metal ring are covered by the two outer plate layers although the latter can, in principle, also terminate radially outside the joining member and the sheet metal ring—in that case only the sum of the thicknesses of the joining member and the sheet metal ring would have to be dimensionally larger by approximately the sum of the material thicknesses of the two outer plate layers.

In principle, the joining member could be cut out of the inner plate layer in any suitable way, for example, by a laser beam. However, as will be apparent from the following, embodiments are preferred wherein the joining member is a punched part which is punched out of the inner plate layer. For, if the joining member is punched out of the inner plate layer with a punching tool comprising a punch with a cutting edge, and a die with a die opening forming a counter cutting edge, one then obtains a cutting clearance which is so narrow that the joining member pushed back into the inner plate layer after the punching-out is held by itself in the opening produced in the inner plate layer by the punching until further steps in the process for manufacturing the cylinder head gasket according to the invention have been carried out. The punching-out of the joining member results at the outer circumference thereof in a cutting zone and a breaking zone which follow one upon the other in the feed direction of the punch entering the die. The narrower the cutting clearance, the longer is the cutting zone. Therefore, a cutting clearance which in accordance with the invention is very narrow results in a relatively long cutting zone and a relatively short breaking zone, which is important for the pushing of the joining member back into the opening in the inner plate layer because the joining member is to remain tension-free. Accordingly, in preferred embodiments of the cylinder head gasket according to the invention, the joining member is inserted into the opening produced in the inner plate layer by the punching-out in the rotary angular position assumed in relation to the axis of the combustion chamber hole during the punching-out. Therefore, such embodiments are, in particular, characterized in that the punching-out of the joining member results in a cutting or punching clearance between joining member and inner plate layer whose average width is several micrometers, preferably not more than 20 μm and, in particular, approximately 10 μm.

If desired, the sheet metal ring could, in particular, also in areas thereof, be somewhat narrower than the joining member. However, embodiments are preferred wherein the joining member and the sheet metal ring—in the plan view of the sheet metal ring or the joining member—are at least approximately congruent.

By an appropriate configuration of the circumference of the punch and the opening of the die of the punching tool for punching out the joining member and the sheet metal ring, respectively, the joining member and the sheet metal ring, respectively, can be given a varying width in order to take into account locally differing component rigidities of engine block and/or cylinder head. A comparable measure is known from DE-A-42 19 709.

If the stopper ring or the stopper ring-like structure is formed by only the joining member and a single sheet metal ring, as is preferred for manufacturing and material reasons, the thickness of the sheet metal ring should be equal to twice the projection of the joining member over the inner plate layer. However, for cylinder head gaskets with two beaded outer plate layers, the thickness of the sheet metal ring can also diverge from this rule for the dimensions, namely when the beads of the two outer plate layers are not of identical height and/or the maximum degree of deformation of the beads is not to be made identical in size.

The sheet metal ring can be placed on the joining member or on the inside of the one outer plate layer. Since, for reasons of handling, the sheet metal ring is expediently joined by welding, it is recommended that the sheet metal ring be placed on the joining member and that the sheet metal ring and the joining member be joined by welding, if possible, concurrently, so that the inner plate layer, the joining member and the sheet metal ring form a firmly coherent component.

The invention also allows the joining member to be immediately brought in an extremely simple way into its end position with respect to the inner plate layer after the punching-out: For this purpose, a method is proposed, in accordance with the invention, wherein the joining member is punched out of the inner plate layer with a punching tool comprising a punch provided with a cutting edge, a die with a die opening forming an opposed cutting edge, and displaceable in the die opening an ejector for the joining member, which can be moved in the direction towards the punch against a stop positioned such that the joining member lying on the ejector resting against this stop is inserted in its desired end position into the opening of the inner plate layer, and wherein after completion of the punching operation, the ejector carrying the joining member is moved against this stop. As the joining member then maintains its position with respect to the inner plate layer, the component consisting of inner plate layer and joining member can be readily handled subsequently, for example, transported to a welding station, without there being the danger that the joining member will no longer be distortion-free in the finished cylinder head gasket because it has fallen out of the inner plate layer or has inadvertently been turned prior to the reinsertion.

Further features, advantages and details of the invention will be apparent from the following description and the appended drawings of several particularly advantageous embodiments of the joining member inserted into an inner plate layer and of the gasket plate of the cylinder head gasket according to the invention.

DESCRIPTION OF THE INVENTION

Figure 1:
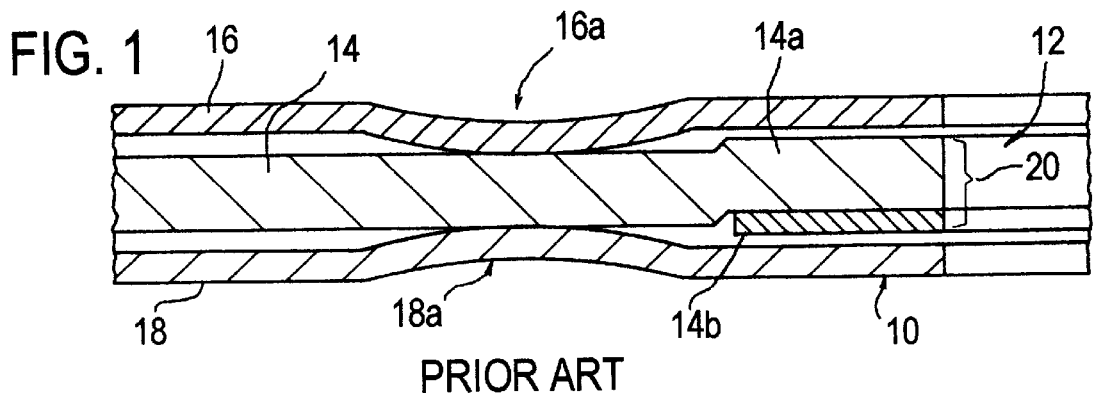
FIG. 1 a section through an area of a gasket plate of a known cylinder head gasket, the said area bordering on a combustion chamber hole.

FIG. 1 shows a section through an area of a gasket plate 10 of a known cylinder head gasket. This area borders on a combustion chamber hole 12 of the gasket plate 10. The gasket plate essentially consists of three sheet steel layers, namely a middle plate layer 14, often also called supporting layer, an upper beaded plate layer 16 and a lower beaded plate layer 18 made of sheet spring steel. These three layers form a laminate through which the combustion chamber hole 12 extends.

Beads 16a and 18a are provided for sealing off the combustion chamber hole. These enclose the combustion chamber hole 12 in the shape of a ring and rest with their tips facing each other against the middle plate layer 14. The middle plate layer 14 is bent at an offset such that a ring-shaped area 14a enclosing the combustion chamber hole 12 projects over the main top surface of the middle plate layer 14 and forms together with a sheet metal ring 14b a ring-shaped stopper area 20 enclosing the combustion chamber hole 12. The sheet thickness of the sheet metal ring 14b is twice as large as the projection of the offset bent area 14a over the main top surface of the middle plate layer 14. Owing to the stopper area 20, the beads 16a and 18a are prevented from being pressed completely flat when clamping the cylinder head gasket between an engine block and a cylinder head, in order to thus maintain their vertical flexibility and their sealing ability while the engine is running.

Figure 2:
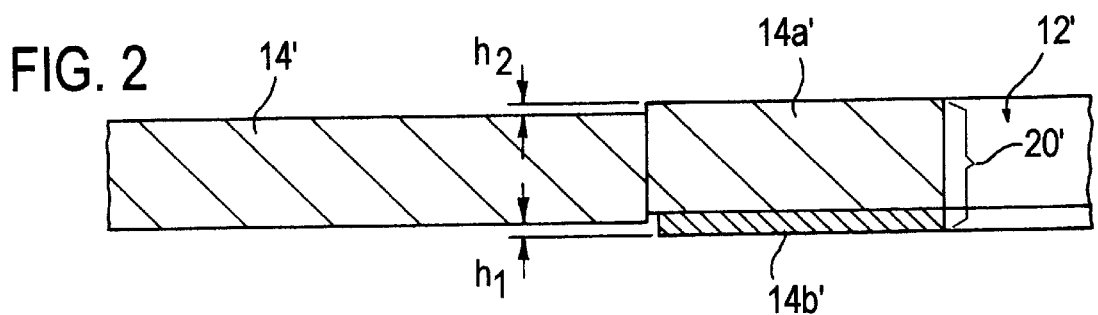
FIG. 2 a section through the stopper ring or the stopper-ring-like structure and the area of an inner plate layer of a first preferred embodiment of the inventive cylinder head gasket, the said area bordering on the stopper ring or stopper-ring-like structure.

In a cylinder head gasket according to the invention, the middle plate layer 14 and the sheet metal ring 14b are replaced by the middle plate layer 14' shown in FIG. 2 and a ring 20' enclosing a combustion chamber hole 12' and consisting of a joining member 14a' and a sheet metal ring 14b'.

In accordance with the invention, the joining member 14a' is punched out of the middle plate layer 14' and then pushed back into this plate layer, while still within the punching tool, in order to bring about in a simple way the final position of the joining member 14a' shown in FIG. 2 relative to the plate layer 14'. The sheet metal ring 14b' is then placed on the joining member 14a', and the two parts of the ring 20' are then joined together and to the middle plate layer 14' at a welding station.

Beaded plate layers corresponding to plate layers 16 and 18 of the known cylinder head gasket shown in FIG. 1 are to be located at both sides of the parts of the inventive cylinder head gasket shown in FIG. 2, with the ring 20' extending radially within the beads 16a and 18a.

If the two beads 16a, 18a are of identical height, which need not necessarily be the case, the projections $h_1$ and $h_2$ drawn in FIG. 2 are of identical size and the thickness of the sheet metal ring 14b' is $2 \cdot h_1$ or $2 \cdot h_2$.

Figure 3:
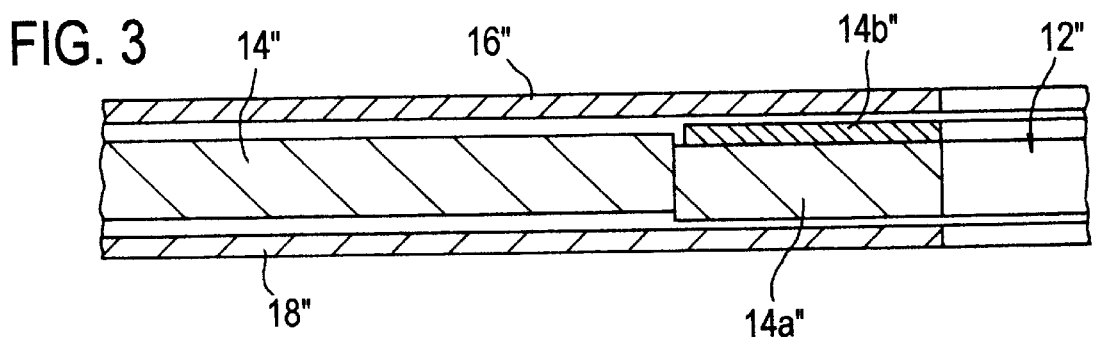
FIG. 3 a section through the area of a gasket plate of a second preferred embodiment of the inventive cylinder head gasket, the said area bordering on a combustion chamber hole.
Figure 4:
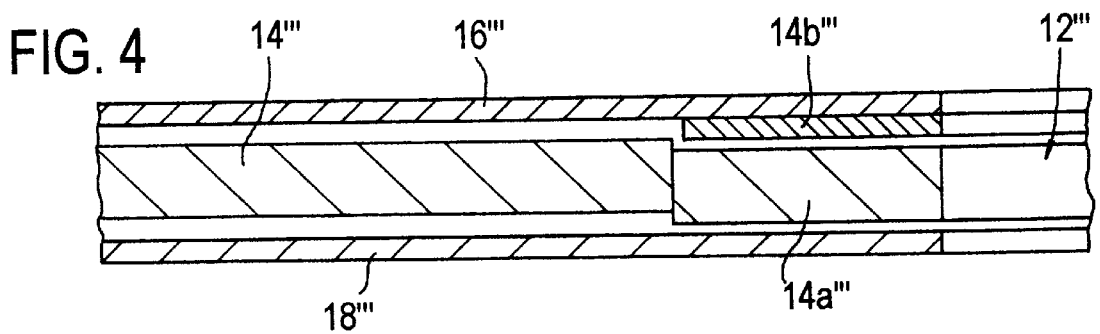
FIG. 4 a variant of the embodiment shown in FIG. 3.

The embodiments according to FIGS. 3 and 4 are conceived for cylinder head gaskets in which the two plate layers of the gasket plate enclosing the inner plate layer between them do not have beads surrounding the combustion chamber hole. In FIGS. 3 and 4, the same reference numerals were used as in FIGS. 1 and 2, but two primes were added to the reference numerals of FIG. 3 and three primes to the reference numerals of FIG. 4.

In the embodiment shown in FIG. 3, the sheet metal ring 14b" rests on the ring-shaped joining member 14a" and is to be joined thereto by several welding spots. The joining member 14a" is to be joined to the middle plate layer 14" likewise by several welding spots. As in the embodiment shown in FIG. 2, the ring formed by the joining member 14a" and the sheet metal ring 14b" projects on both sides to the same extent over the middle plate layer 14".

In the embodiment shown in FIG. 4, the sheet metal ring 14b''' is placed on the upper plate layer 16''' and is to be joined thereto by several welding spots. With its top side, the joining member 14a''' is set back from the main top surface of the middle plate layer 14''' by half of the thickness of the sheet metal ring 14b''' and, consequently, projects to the same extent over the main bottom surface of the middle plate layer 14'''. The joining member 14a''' is also to be joined to the middle plate layer 14''' by several welding spots.

What is claimed is:

1. Cylinder head gasket with a gasket plate comprising at least one combustion chamber hole and at least three metallic plate layers superimposed one upon the other, two outer plate layers thereof receiving between them an inner plate layer having two main surfaces, and with a metallic ring immediately adjacent to said combustion chamber hole and enclosing said combustion chamber hole so as to raise the pressure around said combustion chamber hole when the gasket is mounted between an engine block and a cylinder head, said ring bordering on an inner edge of said inner plate layer which edge encloses said combustion chamber hole, wherein said ring projects over at least one of the two main surfaces of said inner plate layer and comprises a ring-shaped joining member circumferentially completely cut out of said inner plate layer, said joining member having the same thickness as said inner plate layer and being inserted into an opening produced in said inner plate layer by the cutting out of said joining member so that a side of the joining member projects by a fraction of the thickness of said inner plate layer over one of the main surfaces thereof, and wherein a sheet metal ring is arranged between said joining member and that outer plate. layer which faces away from the projecting side of said joining member, the radial outer contour of said sheet metal ring lying, in a plan view of said inner plate layer, within the opening of said inner plate layer, and the thickness of said joining member being a multiple of the thickness of said sheet metal ring.

2. Cylinder head gasket as defined in claim 1, wherein said joining member is a punched part punched out of said inner plate layer.

3. Cylinder head gasket as defined in claim 2, wherein said joining member is inserted into the opening in said inner plate layer in the rotary angular position assumed in relation to the axis of the combustion chamber hole during the punching-out.

4. Cylinder head gasket as defined in claim 3, wherein the punching-out of the joining member results in a cutting or punching clearance whose average width is several micrometers.

5. Cylinder head gasket as defined in claim 3, wherein the punching-out of the joining member results in a cutting or punching clearance whose average width does not exceed 20 μm.

6. Cylinder head gasket as defined in claim 3, wherein the punching-out of the joining member results in a cutting or punching clearance whose average width is about 10 μm.

7. Cylinder head gasket as defined in claim 1, wherein said joining member is joined to said inner plate layer by welding.

8. Cylinder head gasket as defined in claim 1, wherein said joining member and said sheet metal ring are covered by both of said outer plate layers.

9. Cylinder head gasket as defined in claim 1, wherein the thickness of said joining member is at least three times, the thickness of said sheet metal ring.

10. Cylinder head gasket as defined in claim 1, wherein said joining member and said sheet metal ring in the plan view of said sheet metal ring are at least approximately congruent.

11. Cylinder head gasket as defined in claim 1, wherein the thickness of said sheet metal ring is equal to twice the projection of said joining member over said inner plate layer.

12. Cylinder head gasket as defined in claim 1, wherein said sheet metal ring is joined by welding to said joining member or to said outer plate layer adjacent to said sheet metal ring.

13. Cylinder head gasket as defined in claim 1, wherein in order to compensate for a locally differing component rigidity of the engine block and/or cylinder head, the width of said joining member measured in the radial direction in relation to the combustion chamber hole, varies around said combustion chamber hole.

14. Cylinder head gasket as defined in claim 1, wherein each of said outer plate layers has a bead enclosing said combustion chamber hole, protruding in the direction towards said inner plate layer and thus forming a combustion chamber sealing element, said bead extending—in the plan view of said gasket plate—radially outside of said joining member and of said sheet metal ring so that the deformability of said beads in the direction perpendicular to the plane of said gasket plate is delimitable by said joining member and said sheet metal ring.

15. Cylinder head gasket as defined in claim 1, wherein the thickness of said joining member is at least four times the thickness of said sheet metal ring.

16. Cylinder head gasket as defined in claim 1, wherein in order to compensate for a locally differing component rigidity of the engine block and/or cylinder head, the width of said sheet metal ring measured in the radial direction in relation to the combustion chamber hole, varies around said combustion chamber hole.

17. Method of manufacturing a cylinder head gasket having a gasket plate comprising at least one combustion chamber hole and at least three metallic plate layers superimposed one upon the other, two outer plate layers thereof receiving between them an inner plate layer having two opposite main surfaces, wherein a ring-shaped joining member disposed adjacent to said combustion chamber hole and enclosing said hole is positioned in an opening of said inner layer with an outer periphery of the joining member circumferentially bordering on an inner edge of the inner layer which edge defines said opening of the inner layer, said joining member projecting by a predetermined height over a first one of said main surfaces of the inner layer, and wherein a sheet metal ring is disposed between the joining member and that outer layer which faces a second one of the main surfaces of the inner layer, said sheet metal ring having a thickness smaller than that of the joining member and a radial outer contour lying, in a plan view of said inner layer, within said opening of the inner layer, said method comprising the steps of:

(a) punching said joining member out of said inner layer, while simultaneously making said opening in the inner layer, by means of a punching tool comprising a punch displaceable back and forth in a punching direction, a die with a die opening for cooperating with said punch, an ejector displaceable in said die opening back and forth in said punching direction, and a stop means for limiting the displacement of said ejector towards said punch, (b) inserting said joining member into the opening of the inner layer in a rotary angular position assumed in relation to an axis of said opening during the punching step (a) by moving the ejector carrying the joining member toward said punch until the joining member has reached an end position defined by said stop means, said end position being chosen so that in said end position the joining member projects by said predetermined height over said first main surface of the inner layer, and (c) placing said inner layer with said joining member between said outer layers, and said sheet metal ring between the joining member and the outer layer facing said second main surface of the inner layer.

18. Method of manufacturing a cylinder head gasket having a gasket plate comprising at least one combustion chamber hole and at least three metallic plate layers superimposed one upon the other, two outer plate layers thereof receiving between them an inner plate layer having two opposite main surfaces, wherein a ring-shaped joining member disposed adjacent to said combustion chamber hole and enclosing said hole is positioned in an opening of said inner layer with an outer periphery of the joining member circumferentially bordering on an inner edge of the inner layer which edge defines said opening of the inner layer, said joining member projecting by a predetermined height over a first one of said main surfaces of the inner layer, and wherein a sheet metal ring is disposed between the joining member and that outer layer which faces a second one of the main surfaces of the inner layer, said sheet metal ring having a thickness smaller than that of the joining member and a radial outer contour lying, in a plan view of said inner layer, within said opening of the inner layer, said method comprising the steps of:

(a) punching a complete circumference of said joining member out of the inner layer, while simultaneously making said opening in the inner layer, (b) positioning the punched circumference of said joining member into said opening of the inner layer in a rotary angular position assumed in relation to an axis of said opening during the punching step (a) so that said joining member projects by said predetermined height over said first main surface of the inner layer, and (c) placing said inner layer with said joining member between said outer layers, and said sheet metal ring between the joining member and the outer layer facing said second main surface of the inner layer.

* * * * *

UNITED STATES PATENT AND TRADEMARK OFFICE
CERTIFICATE OF CORRECTION

PATENT NO : 6 152 456
DATED : November 28, 2000
INVENTOR(S) : Hans ZIEGLER

It is certified that error appears in the above-identified patent and that said Letters Patent are hereby corrected as shown below:

Replace [73] Assignee: with ---Elring Klinger GmbH---.

Column 6, line 67; after "plate" delete ---.---.

Column 7, line 32; delete ---,---.

Column 7, line 35; after "ring" insert ---,---.

Column 7, line 36; after "ring" insert ---,---.

Column 7, line 48; after "of" insert ---the---.

Signed and Sealed this

First Day of May, 2001

Attest:

NICHOLAS P. GODICI

Attesting Officer

Acting Director of the United States Patent and Trademark Office